(12) United States Patent
Yoon et al.

(10) Patent No.: US 10,791,000 B2
(45) Date of Patent: Sep. 29, 2020

(54) EXTERNAL COMMUNICATION DEVICE, DISPLAY DEVICE, DISPLAY SYSTEM, AND CONTROL METHOD THEREFOR

(71) Applicant: SAMSUNG ELECTRONICS CO., LTD., Suwon-si (KR)

(72) Inventors: Eung Sik Yoon, Suwon-si (KR); Hyun Koo Kang, Yongin-si (KR); Jin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 15/768,751

(22) PCT Filed: Sep. 30, 2016

(86) PCT No.: PCT/KR2016/010978
§ 371 (c)(1),
(2) Date: Apr. 16, 2018

(87) PCT Pub. No.: WO2017/065434
PCT Pub. Date: Apr. 20, 2017

(65) Prior Publication Data
US 2018/0278431 A1  Sep. 27, 2018

(30) Foreign Application Priority Data

Oct. 14, 2015 (KR) .................. 10-2015-0143472

(51) Int. Cl.
*H04L 12/28* (2006.01)
*H04L 29/08* (2006.01)
(Continued)

(52) U.S. Cl.
CPC ............ *H04L 12/282* (2013.01); *H04L 12/28* (2013.01); *H04L 12/2803* (2013.01);
(Continued)

(58) Field of Classification Search
CPC ... H04N 21/4316; H04L 12/28; H04L 12/282; H04L 12/2803; H04L 2012/2841
See application file for complete search history.

(56) References Cited

U.S. PATENT DOCUMENTS

2008/0134237 A1* 6/2008 Tu ................... H04N 5/44543
725/38
2010/0125878 A1   5/2010 Jing et al.
(Continued)

FOREIGN PATENT DOCUMENTS

CN     102227111 A    10/2011
CN     102508473 A     6/2012
(Continued)

OTHER PUBLICATIONS

Kameya et al, JP2008-135935, , Japan (Year: 2008).*
(Continued)

*Primary Examiner* — Ranodhi Serrao
(74) *Attorney, Agent, or Firm* — Sughrue Mion, PLLC

(57) ABSTRACT

An external communication device, display device, display system, and control method therefor are disclosed. In accordance with an aspect of the present disclosure, an external communication device includes a wired communication module connected to a display device and configured to receive standby power; a wireless communication module configured to transmit a power application signal in response to reception of an event signal from at least one Internet of Things (IoT) apparatus via a wireless communication network according to whether the display device is active; and a communication controller configured to control an operation of the at least one IoT apparatus on the basis of a control command received via the wired communication module.

7 Claims, 12 Drawing Sheets

(51) Int. Cl.
    *H04N 21/431*     (2011.01)
    *H04N 21/41*     (2011.01)
    *H04N 5/44*     (2011.01)

(52) U.S. Cl.
    CPC ............ *H04L 29/08* (2013.01); *H04L 67/125* (2013.01); *H04N 5/44* (2013.01); *H04N 21/4131* (2013.01); *H04N 21/4316* (2013.01); *H04L 2012/2841* (2013.01)

(56) References Cited

U.S. PATENT DOCUMENTS

| | | | |
|---|---|---|---|
| 2011/0210816 A1 | 9/2011 | Wang | |
| 2017/0351306 A1* | 12/2017 | Kim | .......................... G06F 1/20 |
| 2017/0374487 A1* | 12/2017 | La | ..................... H04W 52/0235 |

FOREIGN PATENT DOCUMENTS

| | | |
|---|---|---|
| CN | 103188536 A | 7/2013 |
| JP | 2008-135935 A | 6/2008 |
| KR | 10-2011-0086077 A | 7/2011 |
| KR | 10-2013-0058215 * | 6/2013 |
| KR | 10-2013-0058215 A | 6/2013 |
| WO | 2014/130993 A2 | 8/2014 |

OTHER PUBLICATIONS

International Search Report, issued by International Searching Authority in corresponding International Application No. PCT/KR2016/010978, dated Jan. 11, 2017, (PCT/ISA/210).

Written Opinion, issued by International Searching Authority in corresponding International Application No. PCT/KR2016/010978, dated Jan. 11, 2017, (PCT/ISA/237).

Communication dated Apr. 3, 2020 issued by the State Intellectual Property Office of P.R. China in Chinese Application No. 201680038894.0.

\* cited by examiner

EXTERNAL COMMUNICATION DEVICE, DISPLAY DEVICE, DISPLAY SYSTEM, AND CONTROL METHOD THEREFOR

TECHNICAL FIELD

The present disclosure relates to an external communication device, a display device, a display system, and a controlling method therefor.

BACKGROUND ART

The Internet of Things (IoT) refers to an environment in which various apparatuses that exist in daily life are connected via a wired or wireless network to share various pieces of information. In this case, the apparatuses which share various pieces of information with each other via a wired or wireless network are referred to as IoT apparatuses. Specifically, a technology in which various IoT apparatuses indoors are monitored and managed via the IoT is referred to as a smart home technology. In this case, in order to implement the smart home technology, research on the above-described technology for managing the wired or wireless network has been progressing.

DISCLOSURE

Technical Problem

The present disclosure is directed to providing an external communication device, a display device, a display system, and a controlling method therefor.

Technical Solution

In accordance with an aspect of the present disclosure, an external communication device includes a wired communication module connected to a display device and configured to receive standby power; a wireless communication module configured to transmit a power application signal in response to reception of an event signal from at least one Internet of Things (IoT) apparatus via a wireless communication network according to whether the display device is active; and a communication controller configured to control an operation of the at least one IoT apparatus on the basis of a control command received via the wired communication module.

The communication controller controls an operation of the wired communication module and determines whether the display device is active.

When it is determined that the display device is active, the communication controller controls the operation of the wired communication module to transmit event information about the at least one IoT apparatus.

When it is determined that the display device is not active, the communication controller controls the wireless communication module to transmit a power application signal.

The wired communication module receives the power application signal to transmit event information about the at least one IoT apparatus to the activated display device.

The communication controller controls the wireless communication module on the basis of the control command received from the display device, and controls the operation of the at least one IoT apparatus.

The external communication device further includes a clip locked to a wall mount hole of the display device.

The wireless communication module includes at least one of a Bluetooth communication module, a Wi-Fi communication module, a Z-wave communication module, and a Zigbee communication module.

In accordance with another aspect of the present disclosure, a display device includes a power supply configured to supply standby power to a wireless communication module; the wireless communication module activated by the power supply, and configured to receive a power application signal from an external communication device according to whether the display device is active when an event occurs in at least one Internet of Things (IoT) apparatus; and a controller configured to display a user interface configured to provide information about the at least one IoT apparatus on a display.

The controller changes a configuration of the user interface according to event information received from the external communication device using at least one of the wireless communication module and a wired communication module.

The controller displays on a display a user interface configured to provide only information about an IoT apparatus in which an event occurs among the at least one IoT apparatus.

The controller controls a wired communication module and transmits a control command of the at least one IoT apparatus.

Advantageous Effects

According to such an external communication device, display device, display system, and controlling method therefor, a user can selectively use a home hub function and thus convenience for the user can be improved.

MODES OF THE INVENTION

Hereinafter, embodiments of the present disclosure will be described in detail with reference to the accompanying drawings.

Figure 1:
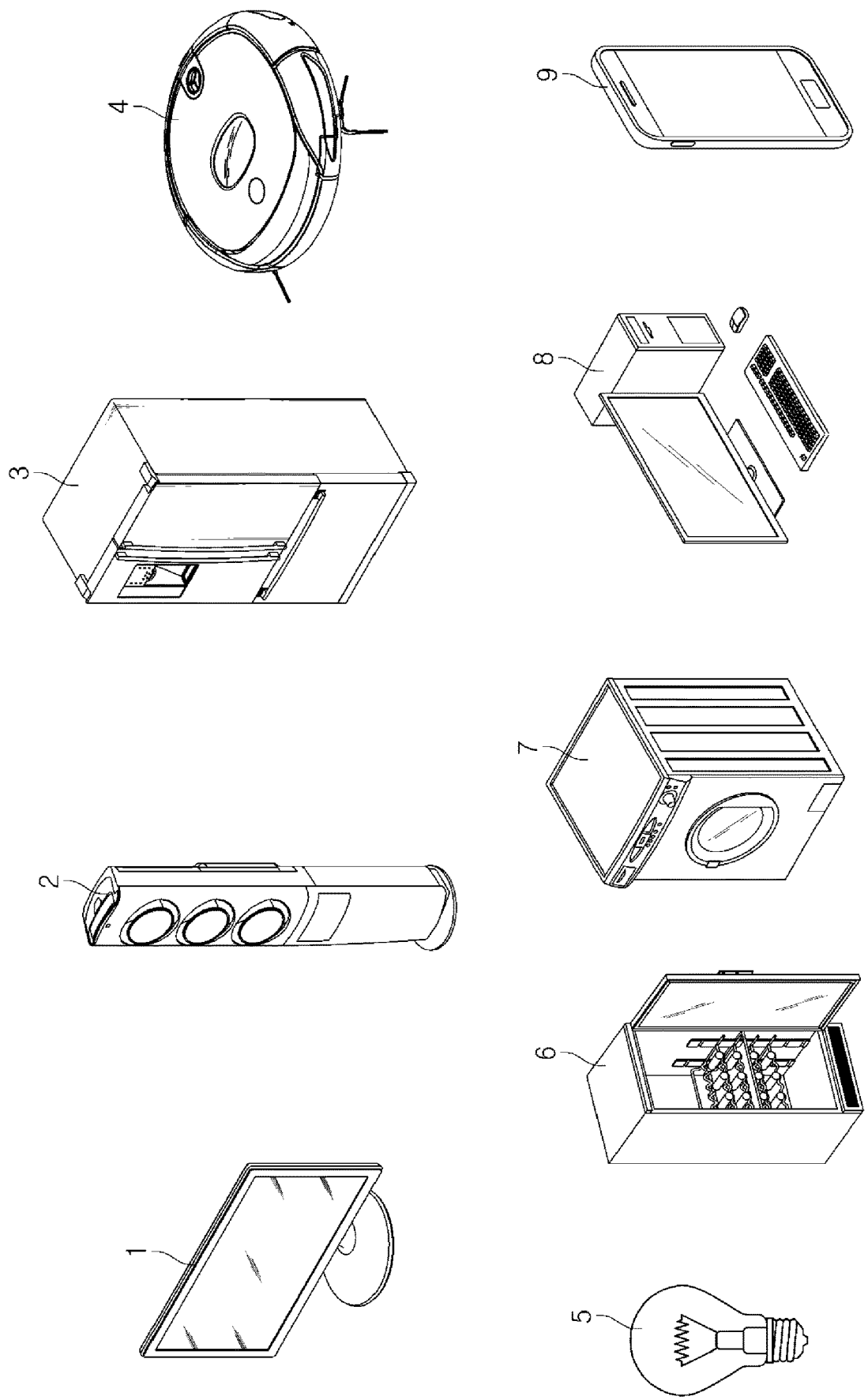
FIG. 1 is a view for describing various types of Internet of Things (IoT) apparatuses according to one embodiment.
Figure 2:
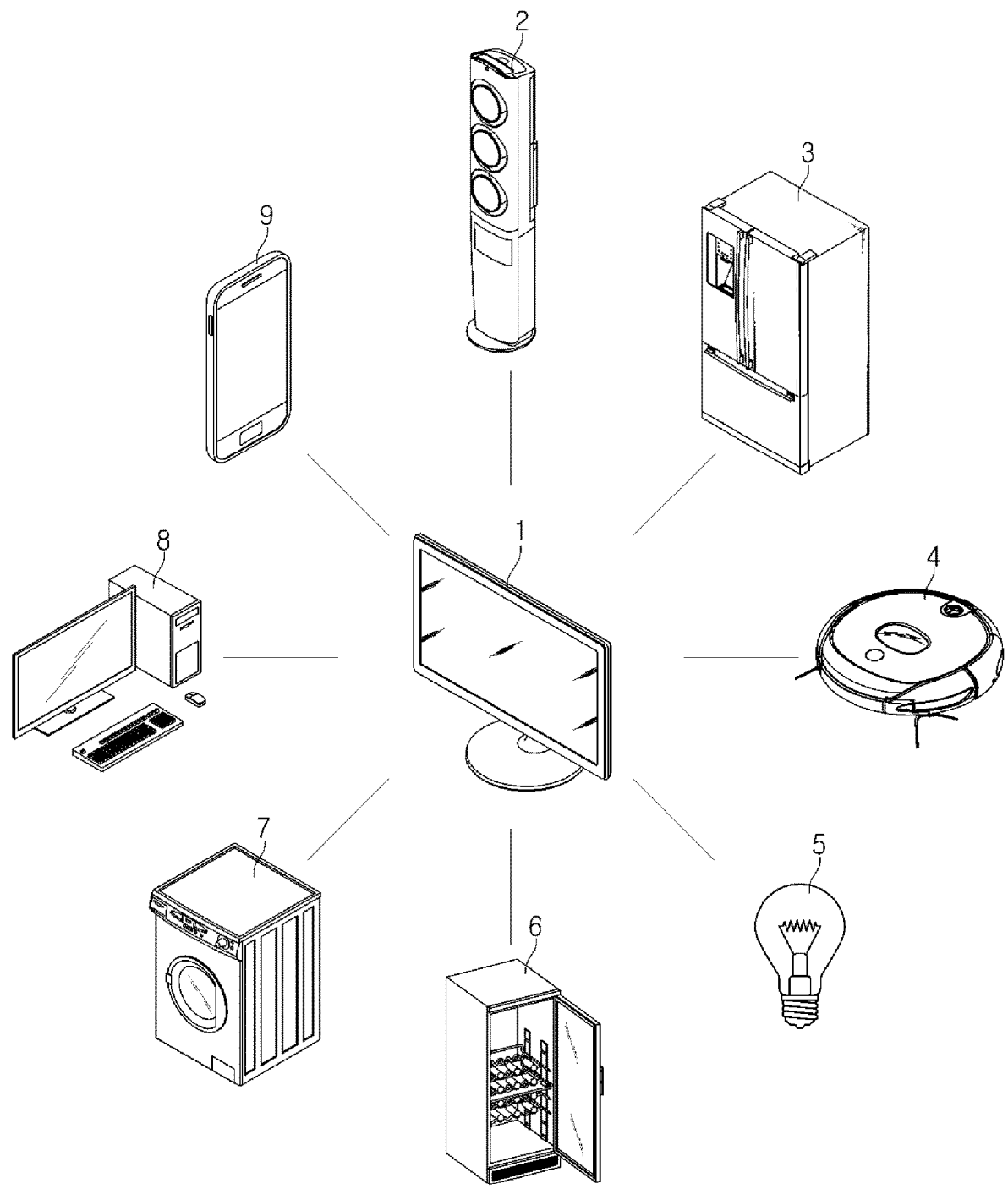
FIG. 2 is a view schematically illustrating a display device, which is one example of IoT apparatuses according to one embodiment, serves as a home hub.
Figure 3:
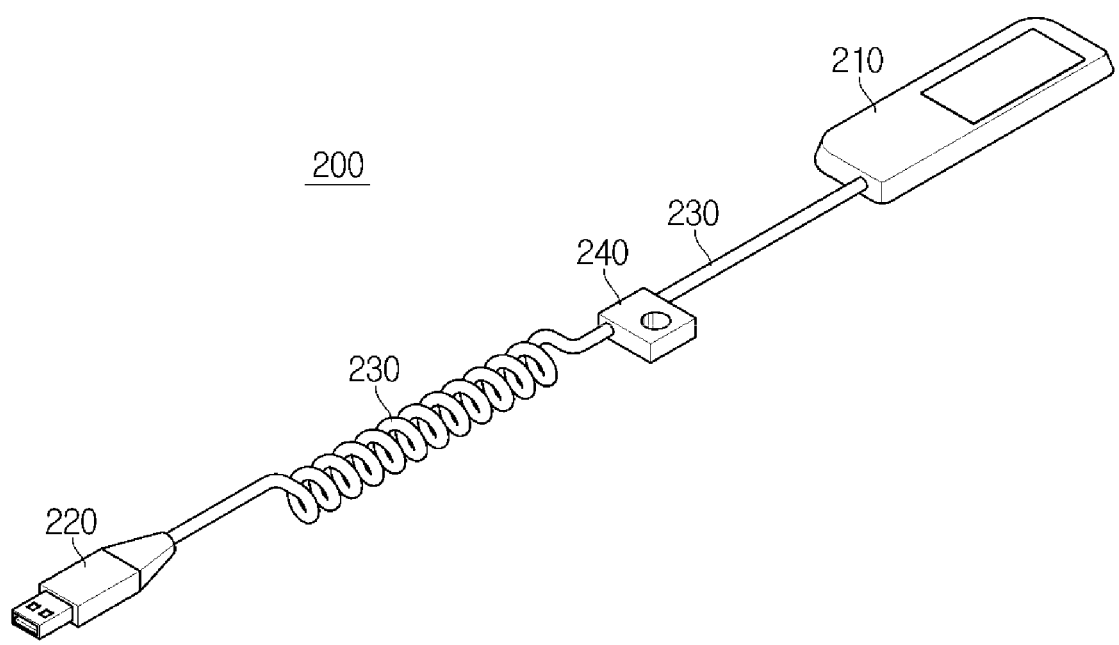
FIG. 3 is a view schematically illustrating an external appearance of an external communication device according to one embodiment.
Figure 4:
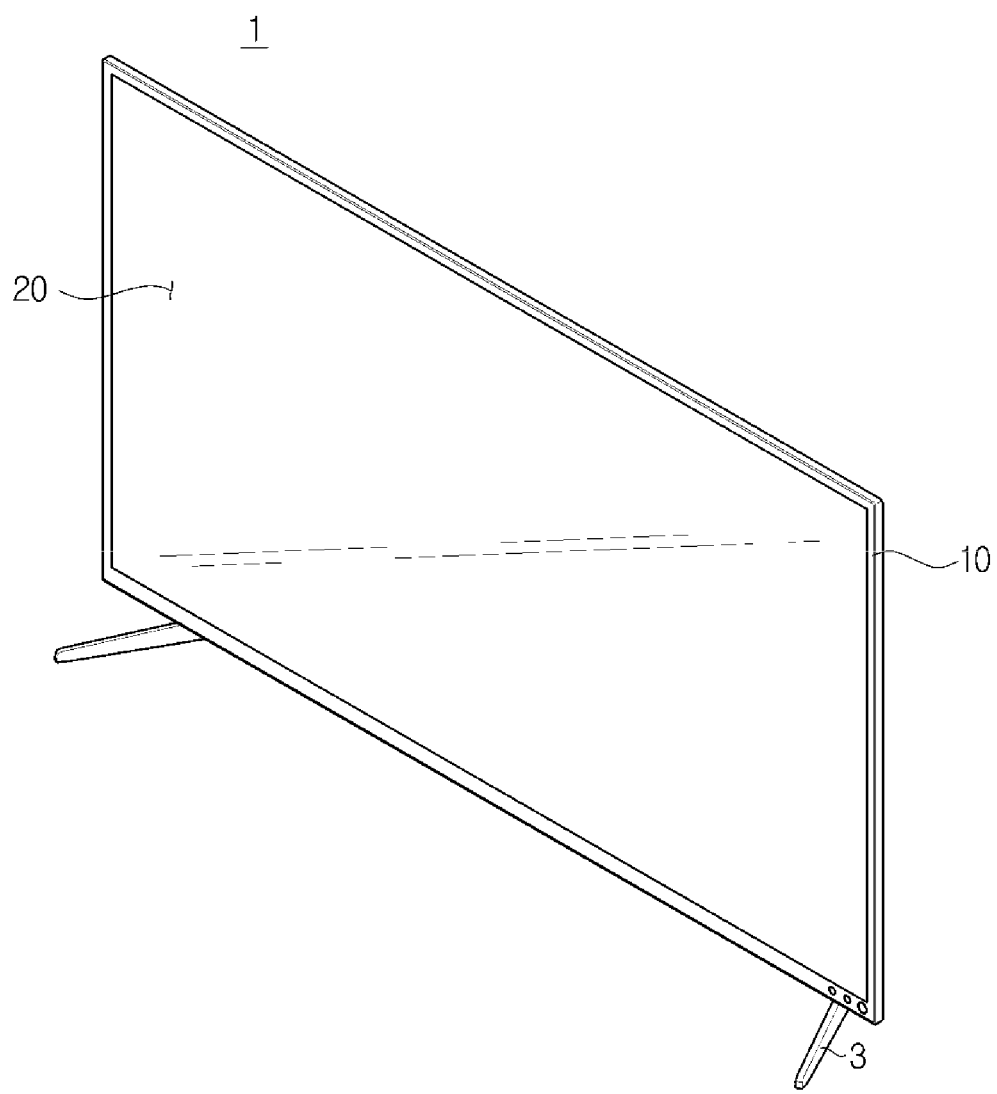
FIG. 4 is a view schematically illustrating an external appearance of a display device, which is one example of IoT apparatuses.

FIG. 1 is a view for describing various types of Internet of Things (IoT) apparatuses according to one embodiment, and FIG. 2 is a view schematically illustrating a display device, which is one example of IoT apparatuses according to one embodiment, serves as a home hub. Also, FIG. 3 is a view schematically illustrating an external appearance of an external communication device according to one embodiment, and FIG. 4 is a view schematically illustrating an external appearance of a display device, which is one example of IoT apparatuses. Hereinafter, descriptions thereof will be given together to prevent replication of description.

IoT apparatuses are various devices that exist in daily life, and refer to devices that can be connected to a home network through an embedded communicator 170 and can exchange data.

For example, as illustrated in FIG. 1, IoT apparatuses include all wearable user terminals such as a smart phone 9, a watch, and glasses as well as home appliances such as a display device 1, an air-conditioner 2, a refrigerator 3, a cleaning robot 4, a lighting apparatus 5, a wine refrigerator 6, a washing machine 7, a desktop computer 8, and the like.

Here, the home network refers to a network which provides a path for allowing all the indoor IoT apparatuses to exchange data and also provides a path for connecting with an external Internet.

The home network may be integrally managed by a gateway server. Specifically, the gateway server of the home network is a server which integrally manages the home network. Any one of the IoT apparatuses may perform an operation of a gateway server or a separate server may perform the operation of the gateway server. In other words, any one of the IoT apparatuses may serve as a home hub.

For example, the display device 1, which is one of the IoT apparatuses, may serve as a home hub as illustrated in FIG. 2 and exchange data with the other IoT apparatuses.

Interaction with a user is important to serve as a home hub. In this case, since information related to an IoT apparatus may be easily provided to the user through a display when the display device 1 serves as a home hub, there is an advantage in that a separate display is not required to be mounted on the IoT apparatus.

Also, since the display device 1 itself has an inputter, such as a display implemented in a touch screen type, a remote controller, a button, or the like, there is an advantage in that the display device 1 can easily receive various control commands from the user.

Therefore, the display device 1 will be described below as one example of an IoT apparatus, but embodiments to be described below are not limited thereto. The embodiments may be applied to any electronic apparatus as long as it can provide various pieces of information to the user through the display and has an embedded processor which controls an operation of the display.

The display device 1 may receive event information and provide the event information to the user when an event occurs in an IoT apparatus. Also, the display device 1 may receive various control commands from the user and control the IoT apparatus on the basis of the received control commands.

In this case, the display device 1 and the IoT apparatus may exchange data with each other using various communication methods. However, when all of the communication modules which support various communication methods are embedded in the display device 1, display device 1 may be burdened and thus may result in a decrease in performance.

Also, since specifications, that is, supported specifications, differs for each display device 1 which is currently sold on the market, it is difficult for the display device 1 to support all of the continuously developing communication methods. Also, when communication modules which support various communication methods are embedded in the display device 1, the price of the display device 1 also increases and price competitiveness decreases.

Therefore, a separate external communication device connected to the display device 1 according to the embodiment and supporting various communication methods may be provided. Accordingly, a communication method not supported by the display device 1 is also supported through the external communication device, and thus the display device 1 may smoothly serve as a home hub. That is, the user may purchase only an external communication device without purchasing another display device 1 again, and use the existing display device 1 as a home hub.

In addition, the cost of the display device 1 may be reduced, the user may selectively use a home hub function of the display device 1, and thus convenience for the user may also be increased.

Hereinafter, the external communication device will be briefly described.

In the case of an external appearance of an external communication device 200, as illustrated in FIG. 3, the external communication device 200 may include a main body 210, in which communication modules configured to support various communication methods and a communication controller configured to control an overall operation of the external communication device 200 are embedded, a Universal Serial Bus (USB) connector 220 configured to support connection to an IoT apparatus, and a cable 230 configured to connect the main body 210 to the USB connector 220.

Also, the external communication device may include a clip 240. A hole into which a screw is inserted may be provided in a rear surface of the display device 1 to fix the display device 1 to a wall. Here, the screw may be a wall mount screw.

In this case, the user may fit the clip 240 into the screw and drive the screw into the hole. Accordingly, the external communication device 200 may be fixed by fitting the clip 240 between the screw and the hole. A detailed description thereof will be given below.

According to one embodiment, the cable 230 may be implemented in the form of a pigtail whose length may vary, as illustrated in FIG. 3. Accordingly, the external communication device may be placed at various locations regardless of a size of the display device 1. However, the form of the cable 230 is not limited to that in the above-described embodiment, and the cable 230 may be implemented in various forms well known to those skilled in the art. A detailed description of the external communication device 200 will be given below.

Hereinafter, the display device 1 will be described in detail.

Figure 5:
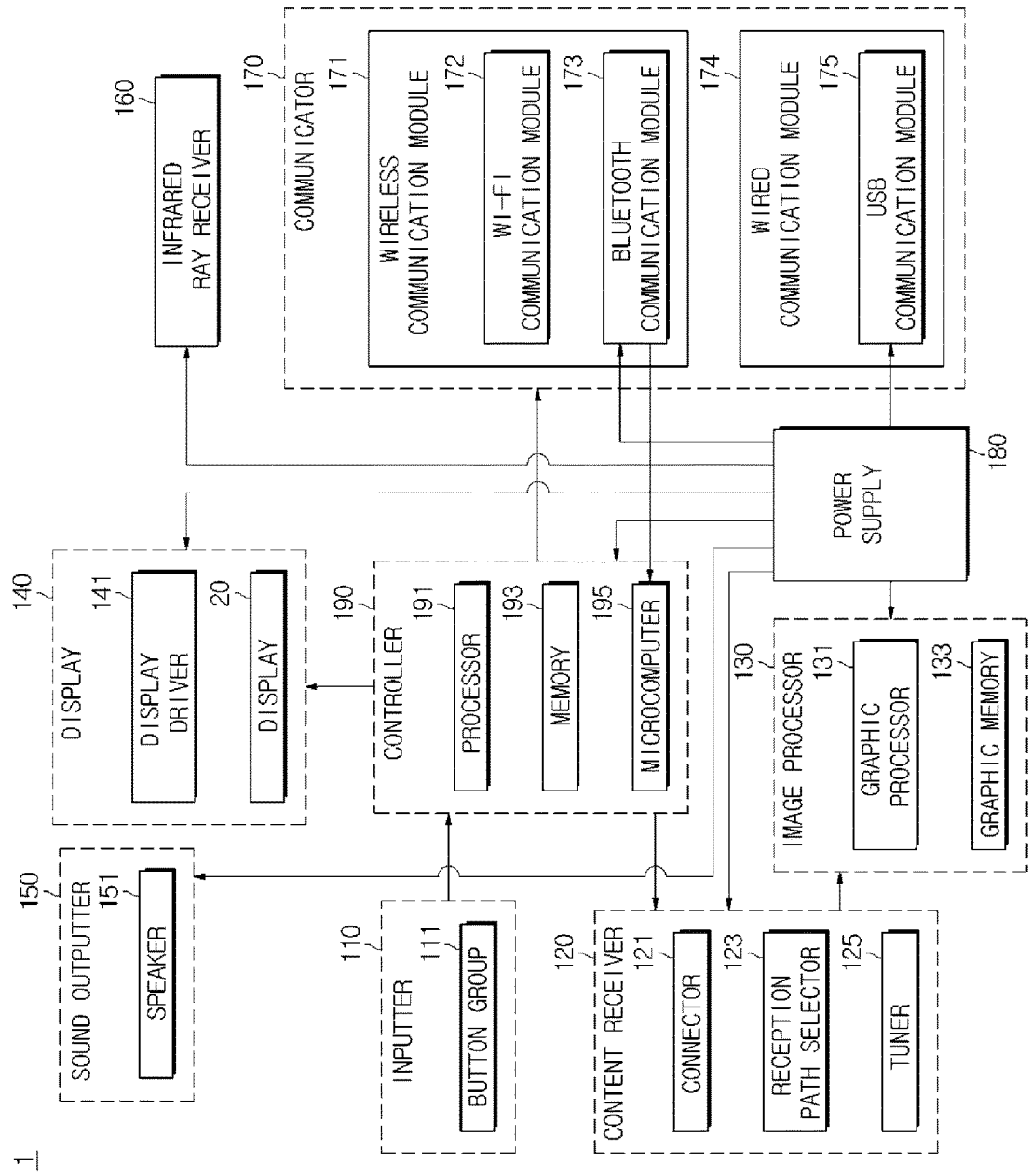
FIG. 5 is a control block diagram of a display device according to one embodiment.

FIG. 5 is a control block diagram of a display device according to one embodiment.

The display device 1 is a device which processes an image signal received externally and visually displays the processed image thereon. Hereinafter, the display device 1 is illustrated as being a television (TV), but the present disclosure is not limited thereto. For example, the display device 1 may be implemented in various forms such as a monitor, a portable multimedia device, and the like, and the form is not limited as long as it is a device which visually displays an image thereon.

The display device 1 may include a main body 10 which forms an external appearance of the display device 1 and accommodates various components constituting the display device 1, and a display 20 which displays an image to a user.

Meanwhile, the display device 1 may be implemented as a stand type or a wall-mounted type according to a supporting system. According to one embodiment, the main body 10 may be implemented as a wall-mounted type in which the main body 10 is installed on a vertical surface such as a wall surface or the like using a bracket or the like. In another embodiment, a stand which supports the main body 10 may be provided under the main body 10. The main body 10 may be stably placed on a plane using the stand.

A button group which receives various control commands from the user and a display which displays an image according to a user control command may be provided on a front surface of the main body 10.

In addition, various components for realizing functions of the display device 1 may be provided inside the main body 10. Hereinafter, the display device 1 will be described with reference to a control block diagram thereof.

As illustrated in FIG. 5, the display device 1 includes an inputter 110 configured to receive a control command from a user, a content receiver 120 configured to receive content including image and sound from an external device, an image processor 130 configured to process image data included in the content, a display 140 configured to display an image corresponding to the image data included in the content, a sound outputter 150 configured to output sound corresponding to sound data included in the content, and a main controller 190 configured to control an overall operation of the display device 1.

Here, the inputter 110 may include a button group 111 configured to receive various control commands from the user. For example, the button group 111 may include a volume button configured to adjust the volume of sound output from the sound outputter 150, a channel button configured to change a communication channel received by the content receiver 120, a power button configured to turn on or off the power of the display device 1, and the like. In addition, the inputter 110 may receive various control commands related to operations of the display device 1 and the IoT apparatus from the user through the button group 111 described above, and the present disclosure is not limited thereto.

Meanwhile, various buttons included in the button group 111 may employ a push switch configured to sense pressure from the user and a membrane switch, a touch switch configured to sense contact from a part of the user's body, and the like. However, the present disclosure is not limited thereto, and the button group 111 may employ various input units that can output an electrical signal corresponding to a specific operation by the user.

Also, the inputter 110 may include a remote controller configured to remotely receive a control command from the user and transmit the received user control command to the display device 1. In addition, the inputter 110 includes various known components capable of receiving control commands from the user. Also, when the display 20 is implemented as a touch screen type, the display 20 may perform a function of the inputter 110.

For example, the inputter 110 may receive a control command related to an IoT apparatus from the user through the button group 111, the remote controller, or the display implemented as a touch screen type, and the like, which are described above. Accordingly, the inputter 110 may transfer the control command related to the IoT apparatus to the controller 190 through a control signal, and the controller 190 may control a communicator 170 to transfer the control command to the external communication device. A detailed description thereof will be given below.

The content receiver 120 may receive various types of content from various external devices. For example, the content receiver 130 may receive content from an antenna configured to receive a broadcast signal in a wireless manner, a set top box configured to receive a broadcast signal in a wired or wireless manner and appropriately convert the received broadcast signal, a multimedia reproduction device (e.g., a digital video disc (DVD) player, a compact disc (CD) player, a Blu-ray player, or the like) configured to reproduce content stored in a multimedia storage medium, and the like.

Specifically, the content receiver 120 may include a plurality of connectors 121 connected to the external device, a reception path selector 123 configured to select a path for receiving content among the plurality of connectors 121, a tuner 135 configured to select a channel (or a frequency) for receiving a broadcast signal in receiving the broadcast signal, and the like.

The connector 121 may include a radio frequency (RF) coaxial cable connector configured to receive a broadcast signal including content from an antenna, and a High-Definition Multimedia Interface (HDMI) connector a component video connector, a composite video connector, a D-sub connector, and the like, which are configured to receive content from a set top box and a multimedia reproduction device.

The reception path selector 133 selects a connector to receive the content among the plurality of connectors 121 described above. For example, the reception path selector 123 may automatically select a connector 133 which receives the content, or manually select a connector 133 which receives the content according to a control command of the user.

The tuner 125 extracts a transmission signal having a specific frequency (channel) among various signals received through an antenna or the like when receiving a broadcast signal. In other words, the tuner 125 may select a channel (or a frequency) to receive the content according to a channel selection command of the user.

Meanwhile, referring to FIG. 5, the display device 1 may include the image processor 130. The image processor 130 may process image content among the content received by the content receiver 120, and provide processed image data to the display 140.

In this case, as illustrated in FIG. 5, the image processor 130 may include a graphic processor 131 and a graphic memory 133. Each of the graphic processor 131 and the graphic memory 133 may be implemented as a single chip. However, each of the graphic processor 131 and the graphic memory 133 is not limited to being implemented as a single chip, and the graphic processor 131 and the graphic memory 133 may be integrated on a single chip.

The graphic processor 131 may process image data stored in the graphic memory 133 according to an image processing program stored in the graphic memory 133. Also, the graphic memory 133 may be configured to store image processing programs and image processing information for image processing, or to temporarily store image information output from the graphic processor 131 or image information received from the content receiver 120.

Meanwhile, referring to FIG. 5, the display device 1 may include the display 140. The display 140 may include a display 20 configured to visually display an image, and a display driver 141 configured to drive the display 20.

The display 20 may include pixels, each serving as a unit for displaying an image. Each of the pixels may receive an electrical signal representing image data and output an optical signal corresponding to the received electrical signal. In this way, optical signals output by a plurality of pixels included in the display 20 are combined, and one image is displayed on the display 20.

Also, the display 20 may be divided into various types of displays according to a method in which each of pixels outputs an optical signal. For example, the display 20 may include a light-emitting display in which a pixel emits light by itself, a transmissive display which blocks or transmits light emitted from a backlight or the like, and a reflective display which reflects or absorbs light incident from an external light source.

Here, the display 20 may be implemented as a cathode ray tube (CRT) display panel, a liquid crystal display (LCD) panel, a light-emitting diode (LED) panel, an organic light-emitting diode (OLED) panel, a plasma display panel (PDP), a field emission display (FED) panel, or the like, and the present disclosure is not limited thereto.

However, the present disclosure is not limited thereto, and the display 20 may employ various display units that can visually display an image corresponding to image data. Meanwhile, the display panel 20 may be simply referred to as a display.

The display driver 141 may receive image data from the image processor 130 according to a control signal of the controller 190 and drive the display 20 to display an image corresponding to the received image data. A detailed description of the controller 190 will be given later.

Also, the display device 1 may include the sound outputter 150.

The sound outputter 150 may receive sound information from the content receiver 120 according to a control signal of the main controller 190 and output sound. In this case, the sound outputter 150 may include one or more speakers 151 configured to convert an electrical signal into a sound signal.

Also, the display device 1 may include an infrared ray receiver 160.

The infrared ray receiver 160 may receive an infrared ray signal. For example, a remote controller may include an infrared ray emitter. When the remote controller receives a control command from a user, the infrared ray emitter may convert the control command into an infrared ray signal and transmit the infrared ray signal. Accordingly, the infrared ray receiver 160 may receive the infrared ray signal and recognize a control command from the infrared ray signal. Here, the infrared ray receiver 160 may be implemented using various methods well known to those skilled in the art, and the present disclosure is not limited thereto.

Meanwhile, the display device 1 may include the communicator 170 as illustrated in FIG. 5. The communicator 170 may include a wireless communication module 171 configured to support a wireless communication method and a wired communication module 174 configured to support a wired communication method, to support various communication methods.

The communication methods include a wireless communication method and a wired communication method. Here, the wireless communication method refers to a communication method in which a signal including data is transmitted and received in a wireless manner. In this case, the wireless communication method includes various communication methods such as third generation (3G) communication, fourth generation (4G) communication, wireless local area network (WLAN), Wi-Fi, Bluetooth, Zigbee, Wi-Fi Direct (WFD), ultra-wideband (UWB), Infrared Data Association (IrDA), Bluetooth Low Energy (BLE), near-field communication (NFC), Z-Wave, and the like, but the present disclosure is not limited thereto.

Also, the wired communication method refers to a communication method in which a signal including data is transmitted and received in a wired manner. For example, the wired communication method includes Peripheral Component Interconnect (PCI), PCI Express, USB, and the like, but the present disclosure is not limited thereto.

For example, the communicator 170 may transmit and receive a wireless signal to and from an IoT apparatus via a base station using a communication method such as 3G communication, 4G communication, or the like. In addition, the communicator 170 may transmit and receive a wireless signal including data to and from an apparatus within a predetermined distance using various wireless communication methods such as WLAN, Wi-Fi, Bluetooth, Z-wave, Zigbee, WFD, UWB, IrDA, BLE, NFC, and the like.

Referring to FIG. 5, the wireless communication module 171 includes a Wi-Fi communication module 172 configured to support a Wi-Fi communication method and a Bluetooth communication module 173 configured to support a Bluetooth communication method. Also, the wired communication module 174 includes a USB communication module 175 configured to support a USB communication method.

Meanwhile, in addition, the communicator 170 may include at least one of communication modules configured to support the communication methods described above, and the present disclosure is not limited to that illustrated in the drawing. In this case, each of the communication modules may be implemented as a single chip for each of the communication methods. However, a plurality of communication modules may be integrated into a single chip, and the present disclosure is not limited thereto.

Also, the display device 1 may include a power supply 180 as illustrated in FIG. 5.

The power supply 180 supplies power to each of the components of the display device 1 to allow the display device 1 to be driven. The power supply 180 may supply power required for driving each of the components to activate the display device 1.

Meanwhile, the power supply 180 may supply standby power to some of the components of the display device 1. Here, the standby power refers to power consumed in a device even when the power is turned off. In other words, the standby power refers to electrical energy supplied into a device even when a plug of the device is just plugged into a socket, regardless of an operation of the device.

Meanwhile, the standby power varies by country, and varies by device. For example, standby power of the display device 1 may be 0.5 W, standby power of a dishwashing machine may be 0.5 W, and standby power of an electric rice cooker may be 2 W. In this way, the standards of the standby power may be determined for each device and for each country.

Even when the main power of the display device 1 is turned off, the power supply 180 may supply the above-described standby power to some components of the display device 1, and thus always keep the display device 1 active.

For example, the power supply 180 may activate the infrared ray receiver 160 through the standby power. Accordingly, even when the display device 1 is turned off, that is, deactivated, the infrared ray receiver 160 may receive an infrared ray signal transmitted from the remote controller to turn the power of the display device 1 on.

Also, the power supply 180 may supply power to the external communication device 200 connected through the USB connector to activate the external communication device even when the display device 1 is turned off. Accordingly, the display device 1 according to the embodiment may recognize that an event occurs in an IoT apparatus using an external communication device driven with lower power than that of the display device 1, and thus the display device 1 may serve as a low-power home hub. Also, the display device 1 according to the embodiment may prevent a problem of the display device 1 always having to be activated as a home hub.

Also, the display device 1 according to the embodiment may receive an event signal through the external communication device 200 even when the display device 1 receives the event signal from the IoT apparatus using an unsupported communication method. To this end, the power supply 180 may activate the Bluetooth communication module 173 using the standby power. Accordingly, the display device 1 according to the embodiment may be informed of the occurrence of an event from the external communication device 200 using the Bluetooth communication module 173.

Meanwhile, the display device 1 may include the controller 190. As illustrated in FIG. 5, the controller 190 includes a processor 191, a memory 193, and a microcomputer (micom) 195. Here, at least one of the processor 191, the memory 193, and the micom 195 may be integrated into a system on a chip (SoC) which is embedded in the display device 1. However, since there may not be just one SoC embedded in the display device 1, the present disclosure is not limited to integration into a single SoC.

The memory 193 may be configured to store a control program and store control data for controlling the operation of the display device 1, and to temporarily store a control signal which is input through the inputter 110 or a control command which is output by the processor 191.

Meanwhile, a method of implementing a user interface, which will be described later, may be implemented as an algorithm or a program and stored in the memory 193. Accordingly, the processor 191 may generate a user interface using data stored in the memory 193.

Also, the above-described algorithm, program, and the like may be stored in an external device. Accordingly, the processor 191 may receive data related to the user interface, which is derived by the external device through the algorithm and the program, through the communicator 170 and display the data on the display panel 20, and the present disclosure is not limited thereto.

The processor 191 may control the overall operation of the display device 1. For example, the processor 191 may generate a control signal for controlling each of the components of the display device 1 to control an operation of each of the components.

In one embodiment, the processor 191 may control the communicator 170 through a control signal to exchange a signal including data with an external device. In another embodiment, the processor 111 may transmit the control signal to the sound outputter 150 according to a sound adjustment command received through the inputter 110 to adjust a volume of sound output through the speaker 151. In still another embodiment, the processor 191 may control the image processor 130 to perform image processing on image information received from the content receiver 120 and may control the display 140 to display image data on which image processing is performed.

Meanwhile, the processor 191 may generate a user interface displayed through the display 20. In one embodiment, the processor 191 may include a graphic processor and implement the graphic user interface described above so that the user interface is displayed on the display 20.

A user interface refers to an environment in which a user can more easily control components and embedded programs of an IoT apparatus and can more easily recognize information about the IoT apparatus. Accordingly, the user may more easily control the IoT apparatus as well as the display device 1 through the user interface, and may more easily recognize information about the display device 1 and the IoT apparatus.

The user interface described below may be a graphic user interface in which a screen displayed on the display 20 is graphically implemented so that interaction between the user and the IoT apparatus is more conveniently performed.

For example, the graphic user interface may be implemented so that icons, buttons, and the like for easily inputting various control commands from the user are displayed on some regions of the screen displayed through the display 20, and various pieces of information are displayed on some other regions through at least one widget.

For example, the processor 191 may display the user interface, configured to provide various pieces of information through at least one widget, on the display 20. Here, the widget refers to a mini application program, which is one of the graphic user interfaces, so that the user may more smoothly interact with application programs for providing various services. That is, the user may easily utilize various application programs through the widget, and may easily check various pieces of information.

Also, the user interface may be divided into a plurality of regions. Widgets may be arranged in some regions of the divided regions to display various pieces of information, and mediators such as icons, buttons, and the like for receiving control commands or supporting connection to application programs may be arranged in some other regions. In this case, a size of each of the divided regions may be variously set.

The processor 191 may display a user interface, which is implemented to provide information about and control of an IoT apparatus paired with the display device 1 as well as information about and control of the display device 1, on the display panel 20.

In this case, since there are various IoT apparatuses indoors, it may be difficult to determine in which IoT apparatus of the user an event has occurred when the user interface configured to provide information about all paired IoT apparatuses is displayed on the display 20. Accordingly, the processor 191 may display on the display panel 20 a user interface implemented to provide information about and control of only IoT apparatuses which have received event information, and the present disclosure is not limited thereto.

In other words, the processor 191 according to the embodiment may provide to the user information about an IoT apparatus in which an event has occurred and a user interface with which control commands may be input, and may allow the user to easily recognize events which have frequently occurred in various IoT apparatuses and to easily control the IoT apparatuses. Meanwhile, a detailed description of the method of implementing the user interface will be given below.

The micom 195 may receive a power on signal and a power off signal and control power supply to each of the components. In this case, the micom 195 may include an interrupt port for receiving the power on and off signals. Accordingly, when the micom 195 receives a power on signal through the interrupt port, the micom 195 activates the processor 191 to allow the display device 1 to be activated through the power supply 180 even when the operation of the display device 1 is stopped. That is, an input terminal of each of the power on/off signals is an interrupt port of the micom 195.

For example, the power supply 180 may activate the infrared ray receiver 160 and the Bluetooth communication module 173 using standby power, and thus the display device 1 may operate even while the main power is not being supplied thereto. Accordingly, when the micom 195 receives a power on signal from at least one of the infrared ray receiver 160 and the Bluetooth communication module 173, the micom 195 allows the main power to be supplied to the display device 1.

In one embodiment, when the power of the display device 1 is turned off, the user may push a power button attached to the remote controller. Then, the remote controller may request turning on the power of the display device 1 through an infrared ray signal. Accordingly, the infrared ray receiver 160 may receive the infrared ray signal, and input a power on signal to the interrupt port of the micom 195. The micom 195 activates the processor 191 so that the display device 1 is activated, that is, the power is turned on.

When the Bluetooth communication module 173 receives an event signal from the external communication device 200, the Bluetooth communication module 173 may input a power on signal to the interrupt port of the micom 195. Then, the micom 195 activates the processor 191 so that the display device 1 is activated through the power supply 180.

Meanwhile, the display device 1 may directly receive the fact that an event has occurred from the IoT apparatus through the communicator 170. However, in order to address problems such as increase in product price, different supported specifications for each product, the display device 1 always having to be activated as described above in order for the display device 1 to directly receive an event signal, and the like, the display device 1 may receive the event signal through the external communication device 200.

Therefore, a specific configuration of the external communication device 200 will be described below.

Figure 6:
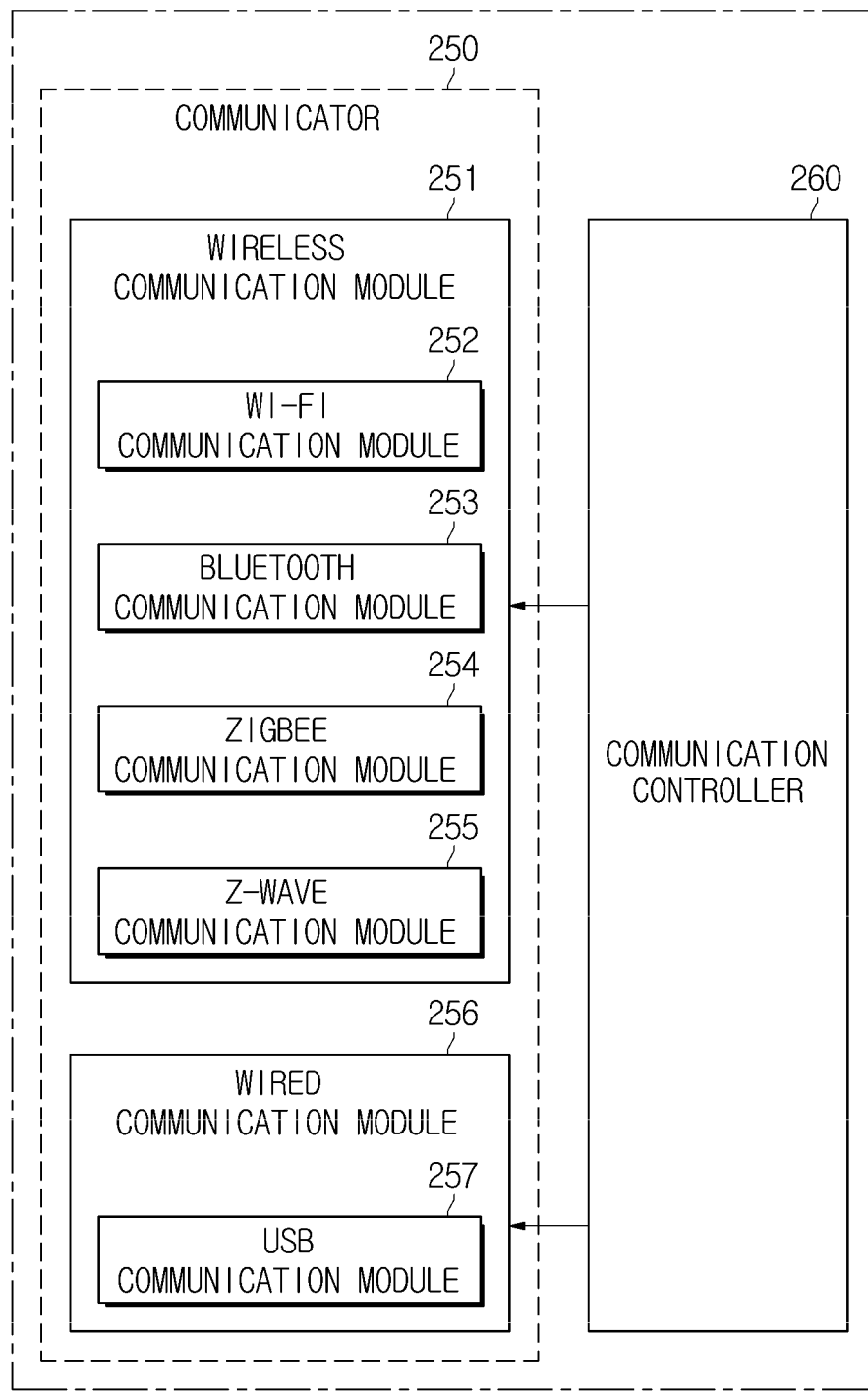
FIG. 6 is a control block diagram of an external communication device according to one embodiment.

FIG. 6 is a control block diagram of an external communication device according to one embodiment.

As described above, the external communication device 200 may include a main body 210 in which a communication controller configured to control an overall operation of the external communication device 200 and the like are embedded, a USB connector 220 configured to support connection to an IoT apparatus, and a cable 230 configured to connect the main body 210 to the USB connector 220.

In this case, as illustrated in FIG. 6, the main body 210 of the external communication device includes a communicator 250 configured to support various communication methods, and a communication controller 260. Here, at least one of the communicator 250 and the communication controller 260 may be integrated into a SoC embedded in the main body 210. However, since there may not be just one SoC embedded in the main body 210, the present disclosure is not limited to being integrated in a single SoC.

The communicator 250 includes a wireless communication module 251 configured to support a wireless communication method and a wired communication module 256 configured to support a wired communication method. For example, the wireless communication module 251 includes a Wi-Fi communication module 252 configured to support a Wi-Fi communication method, a Bluetooth communication module 253 configured to support a Bluetooth communication method, a Zigbee communication module 254 configured to support a Zigbee communication method, and a Z-wave communication module 255 configured to support a Z-wave communication method. The wired communication module 256 includes a USB communication module 257 configured to support a USB communication method.

Meanwhile, in addition, each of the wireless communication module 251 and the wired communication module 256 may include a communication module configured to support the above-described various wireless communication methods and wired communication methods, but the present disclosure is not limited thereto.

Therefore, the external communication device 200 configured to support the above-described wireless communication method and wired communication method as examples of communication methods will be described below, but the present disclosure is not limited thereto, and all of embodiments described below may be also applied to devices configured to support other wired/wireless communication methods.

The wireless communication module 251 may receive various signals from IoT apparatuses using the communication modules 252, 253, 254, and 255 described above. For example, the wireless communication module 251 may receive an event signal from the IoT apparatus using wireless communication methods such as Z-wave, Bluetooth, Wi-Fi, Zigbee, and the like. Here, the event signal includes information about an event that is generated by the user or the device itself, for example an event in which a state of the IoT apparatus is changed, an operation mode in the device is changed, or the like.

The wired communication module 256 may be connected to the display device 1 through a wired connector, and may receive standby power from the display device 1. Accordingly, the external communication device 200 may be activated without a separate battery.

Meanwhile, the communication controller 260 may control an overall operation of the external communication device 200. For example, the communication controller 260 may be implemented as a processor such as a microcontroller unit (MCU) or the like.

The communication controller 260 may generate a control signal and control each of the components of the external communication device 200. For example, the communication controller 260 may control the Bluetooth communication module 253 through a control signal to transmit and receive a wireless signal according to a Bluetooth communication method. As another example, the communication controller 260 may control the USB communication module 257 through a control signal to exchange various types of data with a device connected through the USB connector 220. The communication controller 250 may receive power from the device connected through the USB connector 220.

According to one embodiment, the refrigerator 7 illustrated in FIG. 2 may sense opening and closing of a door through a sensor, a switch, or the like. Accordingly, the refrigerator 7 may transmit an event signal using a Z-wave communication method. Here, the event signal may include information about the opening and closing of the door of the refrigerator 7.

Then, the Z-wave communication module 255 may receive the event signal from the refrigerator 7. When the Z-wave communication module 255 receives the event signal, the communication controller 260 may control the communicator 250 through a control signal to transmit a power application signal to the display device 1 according to whether the display device 1 is active.

The communication controller 260 may control an operation of the wired communication module 250 to determine whether the display device 1 is active. The communication controller 260 may transmit the power application signal to the display device 1 or transmit event information about at least one IoT apparatus to the display device 1 on the basis of the determination result.

For example, the communication controller 260 may transmit an activation determination signal to the display device 1 using a communication method supported by any one of the wired communication modules 174 of the display device 1. Here, the activation determination signal refers to a signal for determining whether the display device 1 is activated, that is, whether the main power is being supplied thereto. For example, the activation determination signal may include a command to transmit a response signal when either the main power is being supplied to the display device 1 or any one of the wired communication modules 174 which provide the communication method for supporting an activation determination signal is activated.

For example, the communication controller 260 may control the USB communication module 257 through the control signal and transmit the activation determination signal to the display device 1 connected through the USB connector 220. Accordingly, when the communication controller 260 receives a response signal from the USB communication module 175 of the display device 1, the communication controller 260 may determine that the display device 1 is activated, and when the communication controller 260 does not receive the response signal, the communication controller 260 may determine that the display device 1 is deactivated. Hereinafter, each of a state in which the display device 1 is activated and a state in which the display device 1 is deactivated will be described.

In one embodiment, when the display device 1 is activated, the communication controller 260 does not need to control the communicator 250 to transmit the power application signal to the display device 1. That is, the communication controller 260 controls the communicator 250 to transmit event information about an IoT apparatus to the display device 1 using at least one of the communication methods.

As another example, when the display device 1 is not active the communication controller 260 may transmit a power application signal on the basis of a communication method supported by an activated communication module among the communication modules of the display device 1. That is, the communication controller 260 according to the embodiment may transmit a power application signal on the basis of a communication method supported by a communication module, which receives standby power and is active, among the communication modules of the display device 1. Accordingly, the communication module of the display device 1 which receives the power application signal may activate the display device 1 through the micom 195.

For example, a communication method used when the display device 1 is deactivated may be preset between the display device 1 and the external communication device 200. Alternatively, the communication controller 260 may control the communication modules 252, 253, 254, 255, and 257 to sequentially transmit wireless signals thereto and to determine with what communication method the power application signal will be transmitted according to whether the response signal is transmitted, and the present disclosure is not limited thereto.

In one embodiment, when the Bluetooth communication module 173 of the display device 1 is activated, the communication controller 260 may transmit the power application signal through the Bluetooth communication module 253. In this case, a module of the communicator 250 of the display device 1, to which standby power will be supplied, may be preset, and the pre-setting may be stored in a memory of the external communication device 200.

In another embodiment, the communication controller 260 may activate the communication module included in the communicator 250 to determine whether the communication module is paired with the display device 1, and to determine the communication module being currently activated on the basis of the determination result. Accordingly, the display device 1 according to the embodiment may receive event information from the IoT apparatus using the external communication device 200 even when the main power thereof is turned off.

When the display device 1 is activated, the communication controller 260 may control the communicator 250 to transmit the event information to the display device 1. Also, when the communication controller 260 receives a control command from the display device 1, the communication controller 260 may control the communicator 250 to transmit a control signal to the IoT apparatus, and thus control the operation of the IoT apparatus.

Hereinafter, interaction between the display device and the external communication device will be described.

Figure 7:
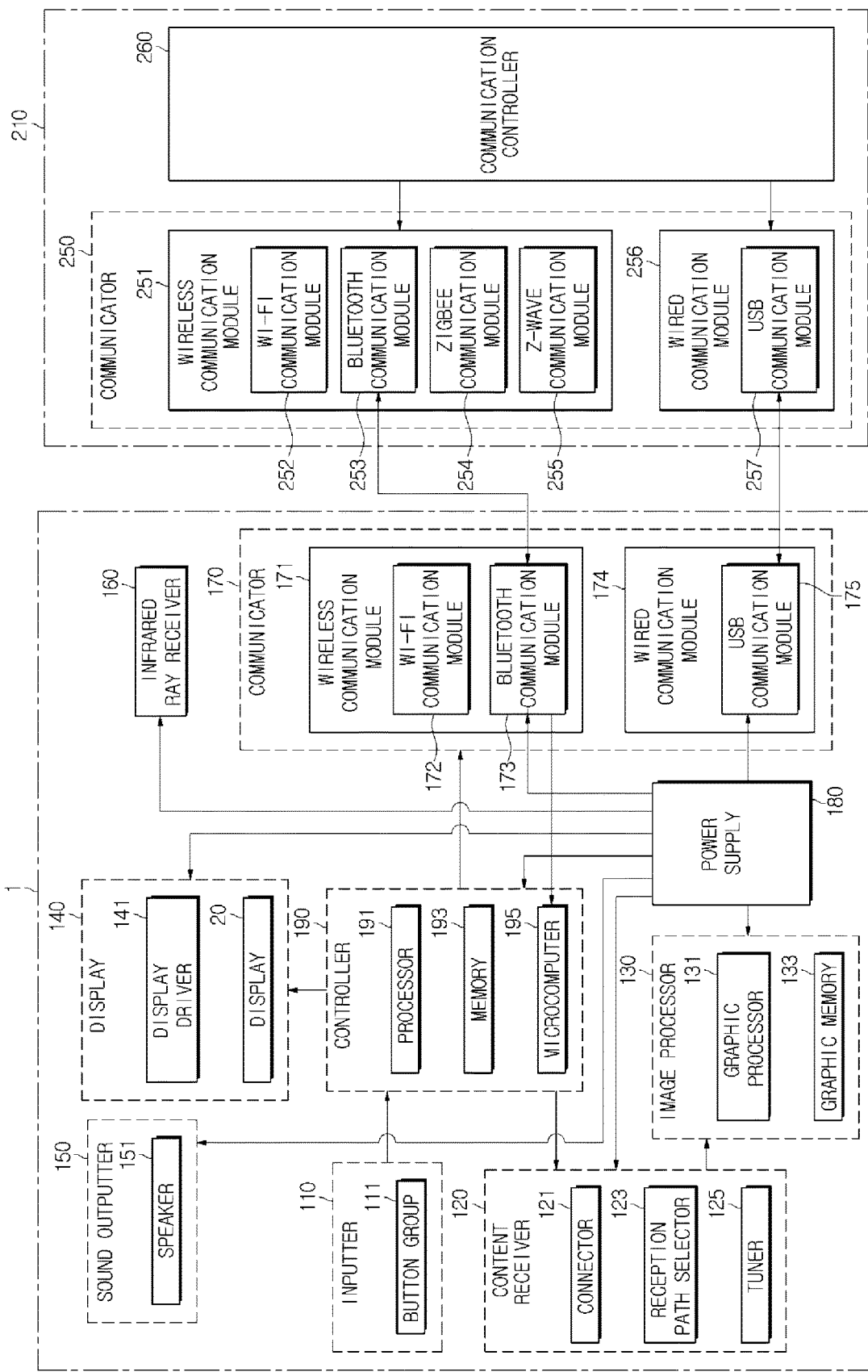
FIG. 7 is a control block diagram of a display system including the display device and the external communication device according to one embodiment.

FIG. 7 is a control block diagram of a display system including the display device and the external communication device according to one embodiment.

Referring to FIG. 7, the display system includes the display device 1 and the external communication device 200. In this case, the display device 1 and the external communication device 200 may be connected via a wireless communication network or a wired communication network.

For example, even when the display device 1 is deactivated, the Bluetooth communication module 173 may be activated through standby power to receive a wireless signal from the Bluetooth communication module 253 of the external communication device 200 as illustrated in FIG. 7.

Even when the display device 1 is deactivated, power may supplied to the external communication device 200 through the USB connector as illustrated in FIG. 7, and thus the external communication device 200 may continuously maintain activation.

In one embodiment, the Z-wave communication module 255 may receive an event signal from an IoT apparatus to transmit to the communication controller 260. Then, the communication controller 260 may control the Bluetooth communication module 253 to transmit a power application signal to the display device 1 using the Bluetooth communication method. Here, the power application signal includes an activation command of the display device 1, that is, a power application command.

The Bluetooth communication module 173 of the display device 1 may receive a power application signal to input a power on signal to the interrupt port of the micom 195. Then, the micom 195 may activate each of the components of the display device 1. Accordingly, the activated processor 191 may control the communicator 170 to receive the event information about the IoT apparatus from the communicator 250 of the external communication device 200.

Then, the processor 191 may display a state of an IoT apparatus and a user interface including icons, buttons, and the like for operating the IoT apparatus on the display 20. A detailed description thereof will be given below.

Figure 8:
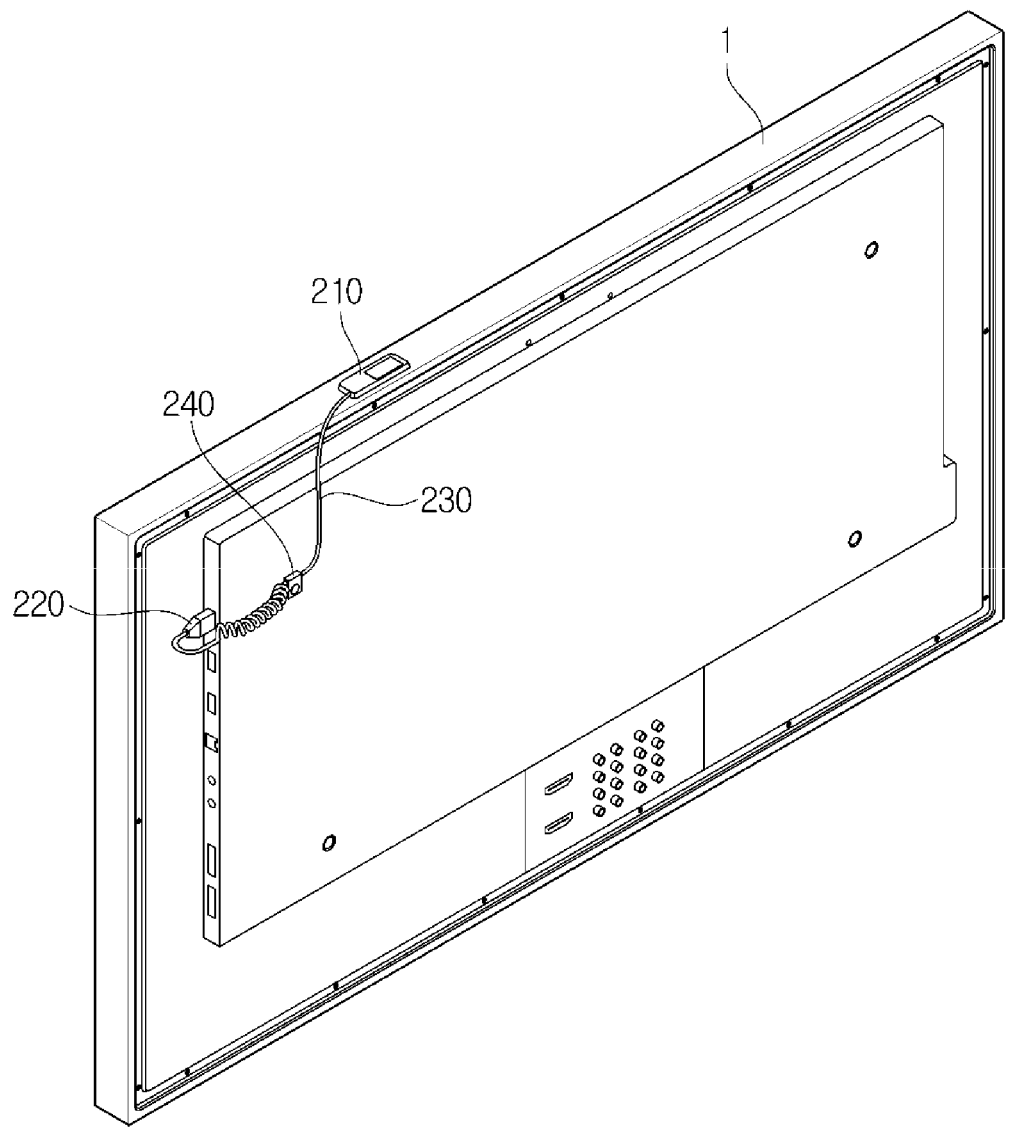
FIG. 8 is a view for describing a case in which an external communication device according to one embodiment is locked and disposed on an upper surface of a display device.

FIG. 8 is a view for describing a case in which an external communication device according to one embodiment is locked and disposed on an upper surface of a display device.

As described above, the external communication device 200 may be connected to the display device 1 through the cable 230. Accordingly, the external communication device 200 may receive power from the display device 1.

Also, the external communication device 200 may receive an event signal from an external device and activate the display device 1. When the display device 1 is activated, the external communication device 200 may transmit event information to the display device 1 through the cable 230 described above, and thus may more rapidly transmit the event information to the display device 1.

Meanwhile, due to a characteristic of the device, metal may be mounted on the display device 1. In this case, when the external communication device 200 is located in the vicinity of a region on which metal is mounted, communication performance may be degraded and an obstacle to exchanging data with the IoT apparatus may occur. The external communication device 200 has an advantage of being portable. However, since the external communication device 200 is easy to separate from the display device 1, the possibility of theft is high.

Therefore, a clip 240 may be provided in the external communication device 200 according to the embodiment. The clip 240 may be mounted on the cable 230 as illustrated in FIG. 8. In this case, the clip 240 may be movably mounted on the cable 230.

Here, a hole into which a screw or the like is inserted may be provided in the clip 240. For example, in the case of a wall-mounted display device 1, a wall mount hole into which a wall mount screw is inserted may be provided on a rear surface of the display device 1. In this case, the clip 240 may be inserted between the wall mount screw and the wall mount hole to fix the external communication device 200 to the display device 1. Accordingly, the external communication device 200 according to the embodiment may be prevented from falling down to the floor and being damaged.

The external communication device 200 is preferably separated from the metal in order to prevent the communication performance from being degraded as described above. To this end, the external communication device 200 may be located on an upper area of the display device 1. In this case, when the external communication device 200 is not fixed, the external communication device 200 may be separated from the upper area of the display device 1 due to movement of or external impact to the display device 1, thus creating a risk of breakage. Therefore, the external communication device 200 according to the embodiment may be prevented from falling by the clip 240, and thus may be prevented from being damaged.

Figure 9:
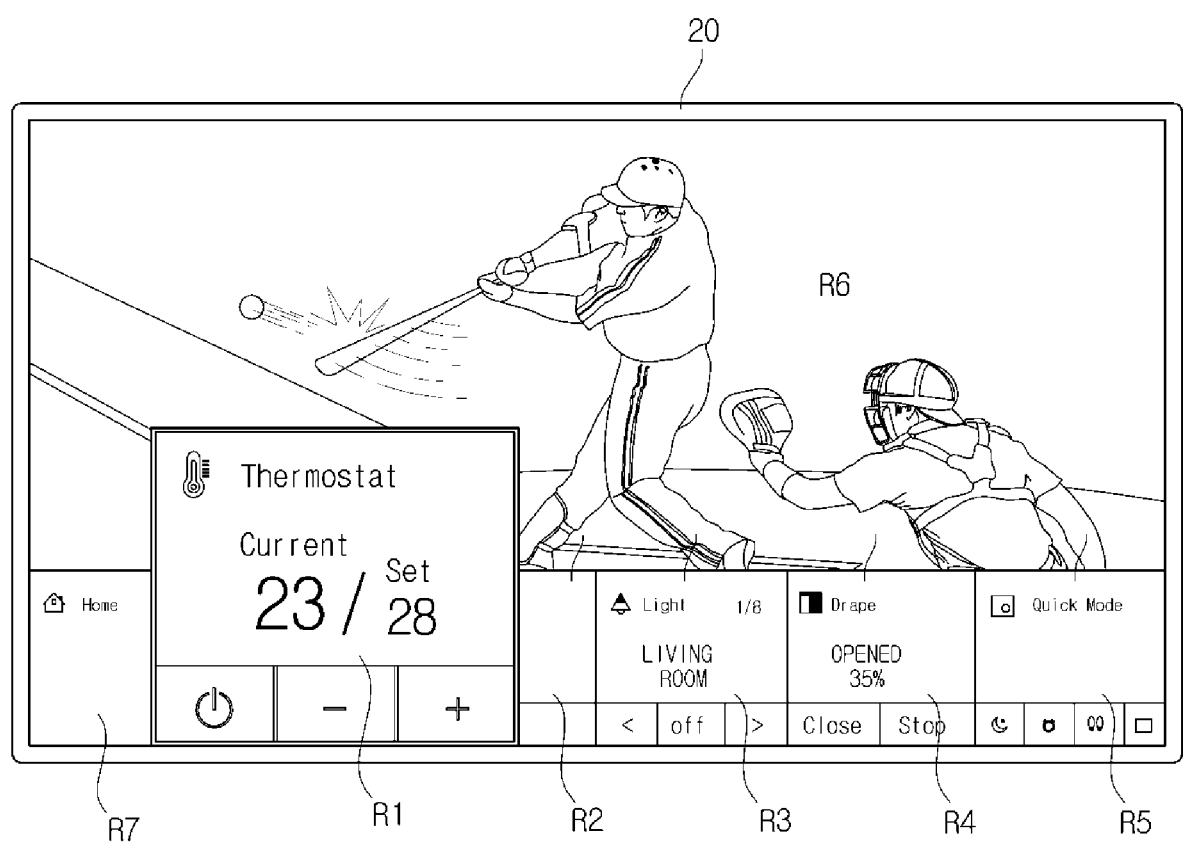
FIG. 9 is a view for describing the user interface displayed on the display according to one embodiment.

FIG. 9 is a view for describing the user interface displayed on the display according to one embodiment.

The display device may provide information about IoT apparatuses as described above, and the user interface configured to input a control command may be implemented in the display device to be displayed on the display 20.

For example, the display device may display the user interface divided into a plurality of regions on the display. In this case, each of the regions may be composed of at least one of media for receiving information and control commands for an IoT apparatus, or composed of a region for providing a function supported by the display device.

Referring to FIG. 9, a user interface in which a screen is divided into seven regions R1, R2, R3, R4, R5, R6, and R7 may be implemented in the display device to be displayed on the display 20. Accordingly, the display device may provide various pieces of information through each of the regions.

In one embodiment, in the display device, a user interface may be implemented which consists of a broadcast image of a channel selected by a user displayed on a sixth region R6, widgets displaying status information about the IoT apparatuses and icons, buttons, and the like, which may input control commands, on first to fifth regions R1 to R5.

Specifically, buttons and the like which may input an operation state of an air conditioner and a control command for the air conditioner may be displayed on the first region R1. Accordingly, the display device may display the operation state of the air conditioner. In addition, the display device may receive the control command of the air conditioner through the inputter and transmit the control command through the external communication device to control an operation of the air conditioner.

Also, buttons and the like which may input a control command of a lighting sensor provided in a living room may be displayed on the third region R3, and buttons and the like which may input an operation state and a control command of an IoT apparatus may be displayed on the fourth region R4. Buttons and the like which may more easily set an operation of an IoT apparatus including the display device may be provided in the fifth region R5, and an icon which may switch to a home screen may be displayed on the seventh region R7.

The user interface may be implemented in the display device so that all pre-paired IoT apparatuses are included therein. In this case, the user interface may be implemented in the display device so that the user can recognize a difference between an IoT apparatus in which an event occurs and an IoT apparatus in which an event does not occur.

In one embodiment, the display device may allow the user to more easily recognize an IoT apparatus in which an event occurs using various methods, such as a method in which a size of a region related to an IoT apparatus in which an event occurs and a size of a region related to an IoT apparatus in which an event does not occur are made different, a method in which texts, images, and the like displayed on both regions are made different, and the like.

The user interface may be implemented in the display device so that only IoT apparatuses in which an event occurs among the paired IoT apparatuses is included therein. The user interface may be implemented in the display device to display event information in the form of a pop-up message, and the present disclosure is not limited thereto.

Figure 10:
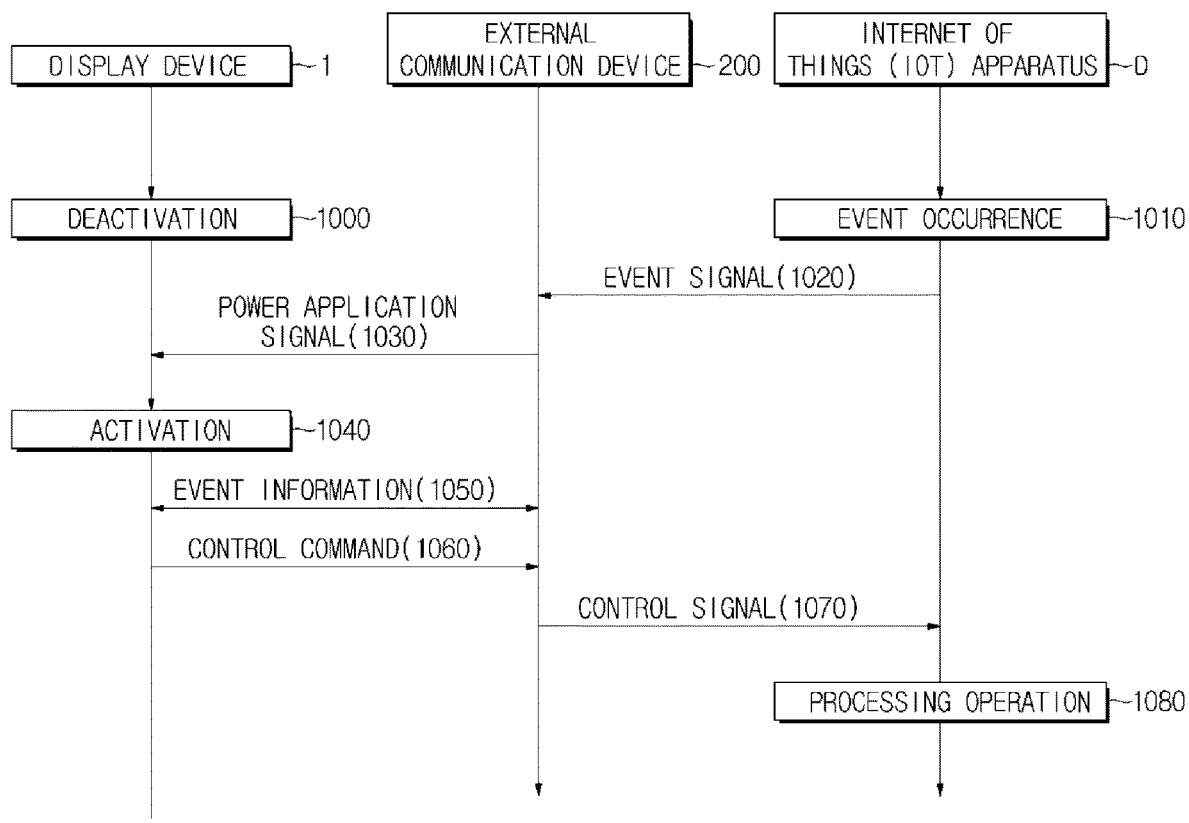
FIG. 10 is a view for describing an operation flow of the display system when the display device according to one embodiment is deactivated.

FIG. 10 is a view for describing an operation flow of the display system when the display device according to one embodiment is deactivated.

The display system includes the display device 1 and the external communication device 200. Hereinafter, an operation flow between the display device 1, the external communication device 200, and an IoT apparatus D will be described.

The display device 1 is deactivated when the main power thereof is turned off (1000). Here, the deactivated state refers to a state in which the main power is turned off but a plug is plugged into a socket. In this case, the display device 1 may receive standby power from a socket and supply the standby power to a component that needs to be activated.

For example, the display device 1 may supply power to an external device connected by a cable through the connector and supply the power to communication modules.

In one embodiment, the display device 1 may supply power to the external communication device 200 connected through the USB connector and supply the power to the Bluetooth communication module to receive a wireless signal from the outside.

Meanwhile, the IoT apparatus D may be located near the display device 1. In this case, in order to exchange data between the IoT apparatus D and the display device 1 or the external communication device 200 via a communication network, pairing should be performed therebetween first. In this case, since a pairing method varies according to the communication method and is performed according to a known method, a detailed description thereof will be omitted. For example, in the case of Bluetooth pairing, it is required to input a password when first pairing, and it is automatically paired without performing a separate pairing operation after the first pairing.

Meanwhile, the IoT apparatus D may sense occurrence of an event. For example, the IoT apparatus D may transmit an event signal via the communication network when an event such as a change in an operation state of a device itself, a change in a state through various control commands input externally or by the user, or the like occurs (1020).

The external communication device 200 may transmit a power application signal to the display device 1 in response to the reception of the event signal (1030). In this case, the external communication device 200 may transmit the power application signal using a communication method supported by an activated communication module among the embedded communication modules of the display device 1.

The display device 1 may be activated by receiving the power application signal (1040). Specifically, the communication module of the display device 1 inputs a power on signal to the micom so that the main power is supplied to the display device 1.

Accordingly, the display device 1 may receive event information which is transmitted by the IoT apparatus D from the external communication device 200 (1050). In this case, the display device 1 may receive event information using at least one of the communication methods supported by the communication modules embedded therein.

For example, the display device 1 may receive event information from the external communication device 200 which is connected through the USB port using the USB communication method, and thus may receive the event information at a higher speed to process an operation of displaying the event information on the display.

Meanwhile, the display device 1 may receive a control command from the user by displaying the user interface on the display as described above. Accordingly, the display device 1 may transmit the control command to the external communication device 200 (1060).

In one embodiment, when the external communication device 200 receives the control command using the USB communication method, the external communication device 200 may transmit to the IoT apparatus D (1070) a control signal converted to conform to a wireless communication method. Then, the IoT apparatus D may perform a processing operation according to the control signal (1080).

Hereinafter, an operation flow of each of the external communication device and the display device will be briefly described.

Figure 11:
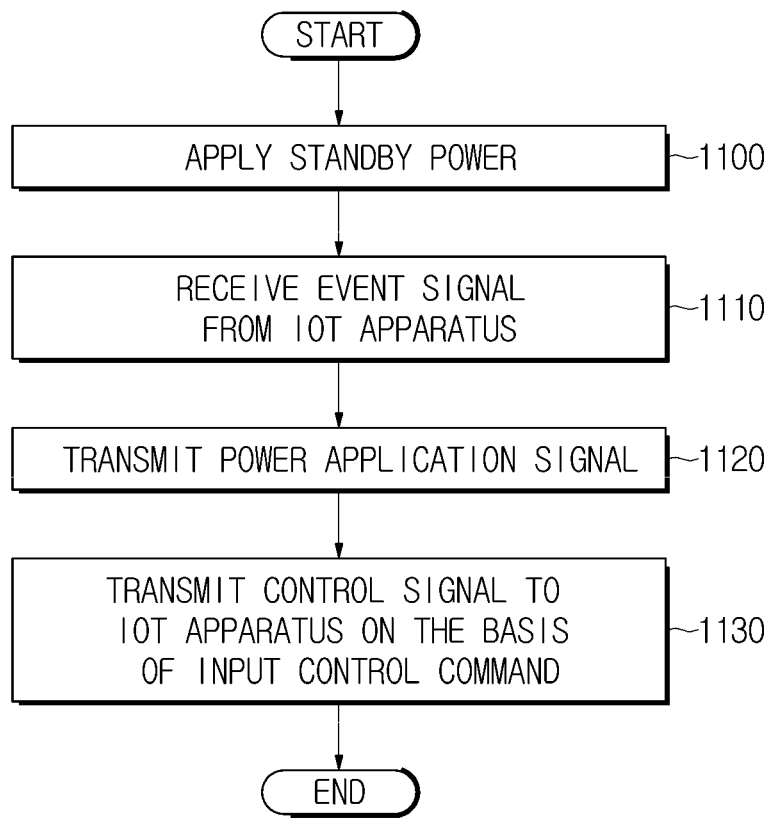
FIG. 11 is a view for describing the operation flow of the external communication device according to one embodiment.

FIG. 11 is a view for describing the operation flow of the external communication device according to one embodiment.

Power supply is required for driving the external communication device. For example, the external communication device may have an embedded battery to supply power by itself.

As another example, the external communication device may receive power from an external device. In one embodiment, the external communication device may be connected to the display device through the USB connector to receive power from the display device. In this case, the display device may be designed to supply power though it cannot exchange data with a device connected through a USB port even when the power thereof is turned off. Accordingly, the external communication device may receive standby power from the display device (1100).

Meanwhile an event may occur in an IoT apparatus. Here, the event refers to a change which occurs in the IoT apparatus. For example, the event refers to a change in an operation mode or state of the IoT apparatus by a control command of the user. When the external communication device is paired with the IoT apparatus via a communication network, the external communication device may receive event information from the IoT apparatus (1110).

Accordingly, the external communication device may transmit the event information to a device serving as a home hub. In this case, when power of the device serving as a home hub is turned off, the external communication device may not transmit the event information to the device. Therefore, the external communication device may induce activation of the device to transmit the event information to the device.

However, when the device serving as a home hub is already activated, the external communication device may transmit the event information to the device without having to perform an activation induction operation. Therefore, the external communication device may determine a state of the device serving as a home hub.

For example, as described above, the external communication device may be connected to the display device serving as a home hub through the USB port. Accordingly, the external communication device may transmit a signal to the display device using the USB communication method. In this case, the signal may include a command to transmit a response signal when the display device is activated. The external communication device may determine a state of the display device according to whether the response signal is received. For example, when the external communication device does not receive the response signal from the display device, the external communication device may determine that the display device is not active.

Accordingly, the external communication device may transmit a power application signal to the display device serving as a home hub (1120). In this case, the power application signal may be transmitted using various communication methods. For example, the external communication device may transmit the power application signal through a communication method supported by an activated communication module among the communication modules embedded in the display device.

The display device may receive standby power to activate some components thereof when a plug thereof is plugged into a socket even though the main power of the display device is turned off. For example, the display device may activate the Bluetooth communication module using the standby power. Then, the external communication device may transmit the power application signal to the Bluetooth communication module using the Bluetooth communication method.

Accordingly, the Bluetooth communication module of the display device may receive the power application signal, and input a power on signal to the interrupt port of the micom. Then, the micom controls the component of the display device to supply the main power to the display device. Supply of the main power through the micom may be performed using various methods well known to those skilled in the art, and the present disclosure is not limited thereto.

When the display device is activated, the external communication device may transmit the event information to the display device. In this case, the external communication device may transmit the event information through a communication method supported by both of the display device and the external communication device.

For example, when the external communication device is connected to the display device through the USB port, the external communication device may transmit the event information using the USB communication method. Corresponding to the above, the external communication device may receive from the display device a control command related to an IoT apparatus and transmit a control signal to the IoT apparatus on the basis of the control command (1130), and thus control an operation of the IoT apparatus.

For example, the display device may display information about an event of an IoT apparatus input from the user through the display and receive a control command related to the IoT apparatus through the inputter. Accordingly, the external communication device may transmit a control signal to the IoT apparatus corresponding to the control command on the basis of the received control command so that the user can control the IoT apparatus through the display device.

Hereinafter, the operation of the display device will be briefly described.

Figure 12:
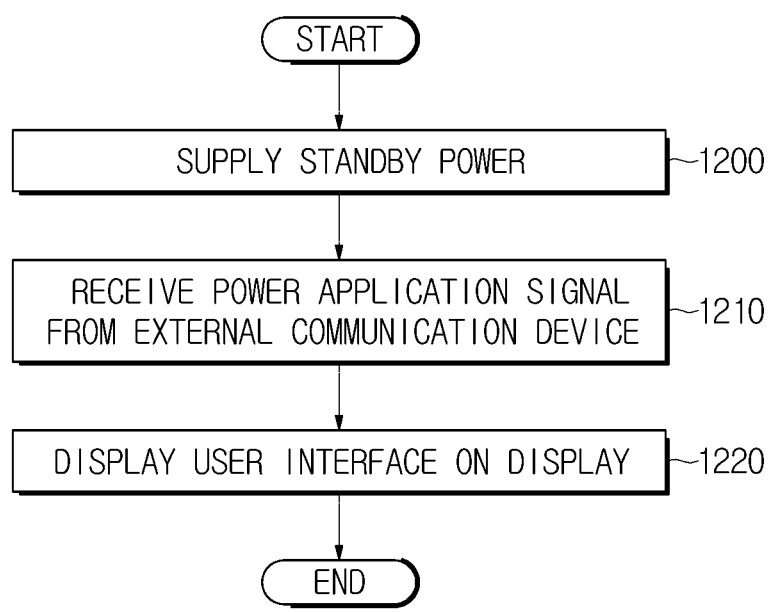
FIG. 12 is a view for describing an operation flow of the display device according to one embodiment.

FIG. 12 is a view for describing an operation flow of the display device according to one embodiment.

The display device may supply standby power to internal components thereof or an external device connected thereto and may activate the internal components or the external device when a plug thereof is plugged into a socket even though the main power thereof is turned off. For example, the display device may activate the Bluetooth communication module embedded therein using the standby power (1200).

Accordingly, the display device may receive a wireless signal according to the Bluetooth communication method through the activated Bluetooth communication module. For example, the display device may receive a power application signal from the external communication device through the Bluetooth communication module (1210).

Then, the main power of the display device may be turned on and the display device may be activated. For example, the Bluetooth communication module may input a power on signal to the micom embedded in the display device to induce the supply of the main power.

However, when the display device is active, that is, when the main power is being supplied to the display device, the display device does not need to receive the power application signal. Therefore, the external communication device may determine a state of the display device, and when the display device is determined to be in a deactivated state, the external communication device may transmit the power application signal to the display device. The determination of the state of the display device may be performed according to whether a signal is transmitted through any one of wired connectors connected to the display device and a response signal is received from the display device. Since a detailed description thereof is the same as that described above, it will be omitted.

Meanwhile, when the display device is activated, the display device may exchange various types of data with the external communication device according to the communication methods supported by the embedded communication modules. For example, the display device may receive event information from the external communication device which is transmitted by an IoT apparatus.

Then, the display device may display the event information described above, and the user interface, which displays icons, buttons, and the like which can control the IoT apparatus which transmits the above-described event information, may be implemented and displayed on the display (1220). Accordingly, the display device allows the user to easily recognize information about the IoT apparatus as well as information about the display device. Also, the display device may receive a control command related to the IoT apparatus from the user and transmit the control command through the external communication device, so that the user can control all of the other devices through the display device.

As described above, when the display device is already active, the display device may directly receive the event information from the external communication device and display the event information on the display.

Embodiments described in this specification and configurations illustrated in drawings are only exemplary examples of the present disclosure. It is understood that the present disclosure covers various modifications that can substitute for the embodiments herein and drawings at the time of filing of this application.

It will be understood that the terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprise," "comprising," "include," and/or "including," when used herein, specify the presence of stated features, integers, steps, operations, components, parts, or a combination thereof, but do not preclude the presence or addition of one or more other features, integers, steps, operations, components, parts, or a combination thereof.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Moreover, terms described in the specification such as "unit," "part," "block," "member," "module," and the like may refer to a unit of processing at least one function or operation, and may refer to software or hardware such as a field-programmable gate array (FPGA) or an application-specific integrated circuit (ASIC). However, the terms "unit," "part," "block," "member," "module," and the like are not limited to software or hardware. "Unit," "part," "block," "member," "module," and the like may be configured to be stored in a recording medium that can be accessed or may be configured to be performed by at least one processor.

The invention claimed is:

1. An external communication device comprising:
a wired communication module configured to connect to a display device, and configured to receive standby power from the display device;
a wireless communication module configured to transmit a power application signal to the display device, in response to reception of an event signal from at least one Internet of Things (IoT) apparatus via a wireless communication network when the display device is not active; and
a communication controller configured to control an operation of the at least one IoT apparatus via the wired communication module, based on a control command received from the display device,
wherein the display device is configured to display a user interface configured to provide information about the at least one IoT apparatus on a display,
wherein the control command is received via the user interface of the display device, and
wherein, after a processor of the display device is activated, the wired communication module is further configured to transmit event information about the at least one IoT apparatus to the display device.

2. The external communication device of claim 1, wherein the communication controller is further configured to control an operation of the wired communication module and determine whether the display device is active.

3. The external communication device of claim 2, wherein, when it is determined that the display device is active, the communication controller is further configured to control the operation of the wired communication module to transmit the event information about the at least one IoT apparatus.

4. The external communication device of claim 2, wherein, when it is determined that the display device is not active, the communication controller is further configured to control the wireless communication module to transmit the power application signal.

5. The external communication device of claim 1, wherein the communication controller is further configured to control the wireless communication module based on the control command received from the display device, and control the operation of the at least one IoT apparatus.

6. The external communication device of claim 1, further comprising a clip locked to a wall mount hole of the display device.

7. The external communication device of claim 1, wherein the wireless communication module includes at least one of an ultra high frequency (UHF) radio wave communication module, a wireless networking communication module, a wireless mesh network wave communication module, or a personal area network communication module.

* * * * *